United States Patent
Liu

(10) Patent No.: US 9,733,772 B2
(45) Date of Patent: Aug. 15, 2017

(54) CORRECTION APPARATUS AND CORRECTION METHOD FOR SELF-CAPACITIVE TOUCH PANEL

(71) Applicant: MStar Semiconductor, Inc., Hsinchu Hsien (TW)

(72) Inventor: Tzu-Wei Liu, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 65 days.

(21) Appl. No.: 14/656,830

(22) Filed: Mar. 13, 2015

(65) Prior Publication Data

US 2015/0261358 A1    Sep. 17, 2015

(30) Foreign Application Priority Data

Mar. 14, 2014    (TW) ............................... 103109343 A

(51) Int. Cl.
  *G06F 3/044*    (2006.01)
  *G06F 3/041*    (2006.01)

(52) U.S. Cl.
  CPC ............ *G06F 3/044* (2013.01); *G06F 3/0418* (2013.01)

(58) Field of Classification Search
  CPC ........................ G06F 3/041–3/04892
  See application file for complete search history.

(56) References Cited

U.S. PATENT DOCUMENTS

| | | | | |
|---|---|---|---|---|
| 6,297,811 B1* | 10/2001 | Kent | ....................... | G06F 3/044 178/18.01 |
| 2008/0259044 A1* | 10/2008 | Utsunomiya | ........... | G06F 3/044 345/173 |
| 2011/0025638 A1* | 2/2011 | Salaverry | ................ | G06F 3/044 345/174 |
| 2012/0256872 A1* | 10/2012 | Kawaguchi | ............. | G06F 3/044 345/174 |
| 2014/0028334 A1* | 1/2014 | Liu | ..................... | G01R 27/2605 324/679 |
| 2014/0049121 A1* | 2/2014 | Liu | ........................ | G06F 3/0418 307/650 |
| 2014/0104232 A1* | 4/2014 | Liu | ........................ | G06F 3/044 345/174 |

(Continued)

*Primary Examiner* — Nalini Mummalaneni
*Assistant Examiner* — Ivelisse Martinez Quiles
(74) *Attorney, Agent, or Firm* — Edell, Shapiro & Finnan, LLC

(57) ABSTRACT

A correction apparatus for a touch panel is provided. The touch panel includes multiple upper electrodes and multiple lower electrodes interleaved along a first reference direction. An initial coordinate calculation module calculates a first initial coordinate in the first reference direction and a second initial coordinate in a second reference direction of a touch position according to sensing results associated with the upper electrodes and sensing results associated with lower electrodes. A correction parameter calculation module calculates a first correction parameter according to the sensing results of the lower electrodes, and calculates a second correction parameter according to the sensing results of the upper electrodes. A compensation calculation module calculates a compensation amount according to the first correction parameter, the second correction parameter and the first initial coordinate. A correction module corrects the second initial coordinate according to the compensation amount.

12 Claims, 5 Drawing Sheets

(56) References Cited

U.S. PATENT DOCUMENTS

2014/0118282 A1* 5/2014 Wen .................. G06F 3/0418
                                                  345/173
2014/0320443 A1* 10/2014 Lin .................. G06F 3/0418
                                                  345/174

* cited by examiner

CORRECTION APPARATUS AND CORRECTION METHOD FOR SELF-CAPACITIVE TOUCH PANEL

This application claims the benefit of Taiwan application Serial No. 103109343, filed Mar. 14, 2014, the subject matter of which is incorporated herein by reference.

BACKGROUND OF THE INVENTION

Field of the Invention

The invention relates in general to a touch control system, and more particularly, to a technology for correcting sensing results of a touch panel.

Description of the Related Art

Operating interfaces of recent electronic products have become increasingly user-friendly and intuitive with the progressing technology. For example, through a touch screen, a user can directly interact with applications and input messages/texts/patterns with fingers or a stylus, thus eliminating complexities associated with other input devices such as a keyboard or buttons. In practice, a touch screen usually comprises a touch panel and a display disposed at the back of the touch panel. According to a touch position on the touch panel and a currently displayed image on the display, an electronic device determines an intention of the touch to execute corresponding operations.

Existing capacitive touch sensing techniques can be roughly categorized into self-capacitive and mutual-capacitive types. Compared to mutual-capacitive touch panels, self-capacitive touch panels can be implemented through a single-layer electrode with a simpler manufacturing process and lower costs, and thus prevail in many entry-level electronic products.

FIG. 1 is an exemplary electrode configuration of a self-capacitive touch panel. A sensing region 100 represented by a dotted frame includes a plurality of triangular electrodes in a staggered arrangement along the X direction. Each of the electrodes may be connected to a sensor (not shown) that detects a capacitance change of the connected electrode. The capacitance changes detected by the sensors are forwarded to a controller (not shown), which accordingly determines a user touch position. Generally known to one person skilled in the art, as limited by the sensing accuracy (related to factors such as the number/shape of electrodes and the number of sensors) of the touch panel, a difference inevitably exists between an actual user touch position and a touch position determined by an electronic apparatus. Taking the electrode shape/configuration in FIG. 1 for example, when a user touches the left or right border of the sensing region 100, the Y coordinate in a sensing result frequently contains a large error. Given an excessively large error in the sensing result, it is expected that the electronic apparatus likely misjudges a touch intention of the user to lead to an unintended operation. Therefore, there is a need for a correction mechanism.

In a current correction method, a look-up table (LUT) is first established. The LUT stores various possible sensing results and corresponding correction results. In a situation where a sensing result is two-dimensional X/Y coordinates, if there are an N number of X/Y combinations for a sensing result, the LUT needs to store a total of N sets of non-corrected two-dimensional coordinates (X/Y) and corrected two-dimensional coordinates (X"/Y"), meaning that such approach suffers from a drawback of requiring a massive memory space for the LUT.

SUMMARY OF THE INVENTION

The invention is directed to a correction apparatus and a correction method. By identifying correlation between a corrected coordinate and a non-corrected coordinate, and expressing the correlation in a mathematical equation, the correction apparatus and the correction method of the present invention are capable of calculating the corrected coordinate. The correction apparatus and the correction method of the present invention involve no LUTs and thus reduce hardware costs of a touch control system.

According to an embodiment of the present invention, correction apparatus for a self-capacitive touch panel is provided. The correction apparatus includes an initial coordinate calculation module, a correction parameter calculation module, a compensation calculation module and a correction module. The touch panel includes a plurality of upper electrodes and a plurality of lower electrodes. The lower electrodes and the upper electrodes are in a staggered arrangement along a first reference direction. The initial coordinate calculation module calculates a first initial coordinate in the first reference direction and a second initial coordinate in a second reference direction of a touch position according to at least one sensing result associated with the upper electrodes and at least one sensing result associated with the lower electrodes, respectively. The second reference direction is perpendicular to the first reference direction. The correction parameter calculation module calculates a first correction parameter according to the at least one sensing result associated with the lower electrodes, and calculates a second correction parameter according to the at least one sensing result associated with the upper electrodes. The compensation calculation module calculates a compensation amount according to the first correction parameter, the second correction parameter and the first initial coordinate. The correction module corrects the second initial coordinate according to the compensation amount.

According to another embodiment of the present invention, a correction method for a self-capacitive touch panel is provided. The touch panel includes a plurality of upper electrodes and a plurality of lower electrodes. The lower electrodes and the upper electrodes are in a staggered arrangement along a first reference direction. The method includes: calculating a first initial coordinate in the first reference direction and a second initial coordinate in a second reference direction of a touch position according to at least one sensing result associated with the upper electrodes and at least one sensing result associated with the lower electrodes, wherein the second reference direction is perpendicular to the first reference direction; calculating a first correction parameter according to the at least one sensing result associated with the lower electrodes, and calculating a second correction parameter according to the at least one sensing result associated with the upper electrodes; calculating a compensation amount according to the first correction parameter, the second correction parameter and the first initial coordinate; and correcting the second initial coordinate according to the compensation amount.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
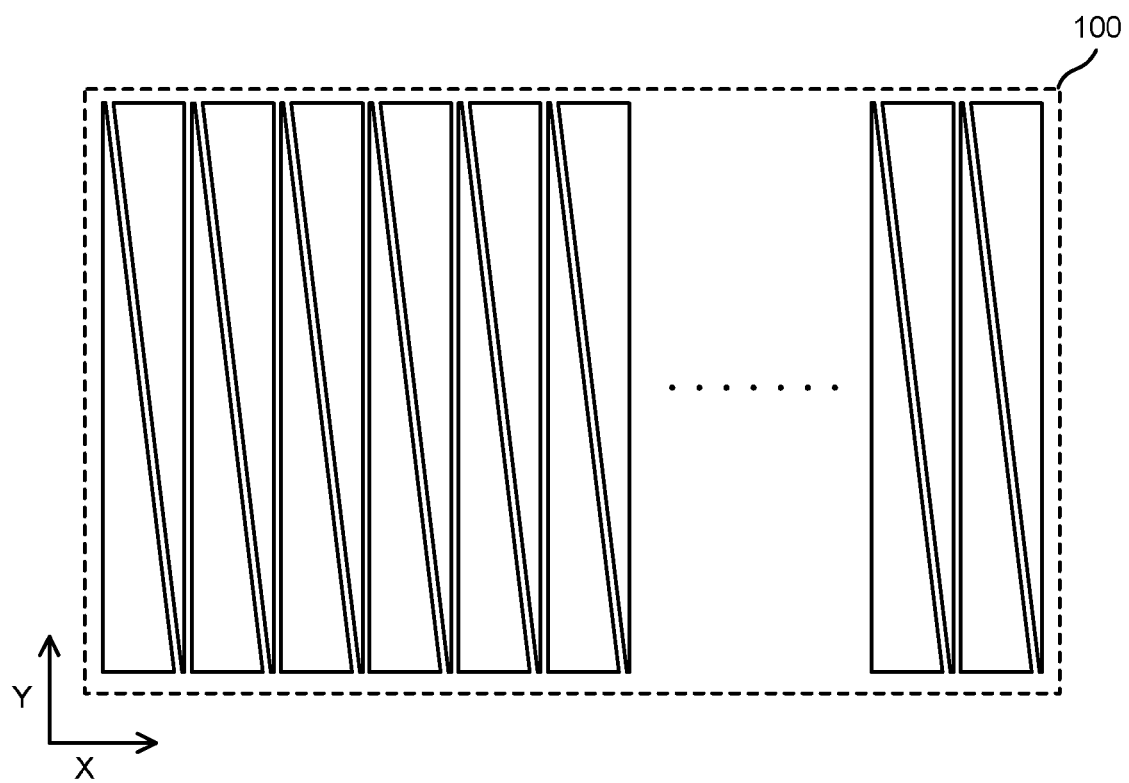
FIG. 1 is an exemplary electrode configuration of a conventional self-capacitive touch panel.
Figure 2:
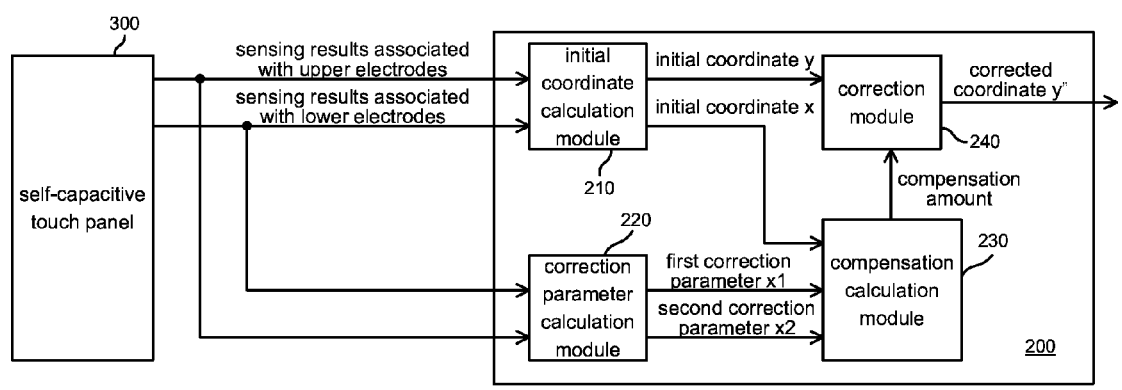
FIG. 2 is a function block diagram of a correction apparatus according to an embodiment of the present invention.

FIG. 2 shows a function block diagram of a correction apparatus 200 according to an embodiment of the present invention. The correction apparatus 200 is applied to a self-capacitive touch panel 300, and includes an initial coordinate calculation module 210, a correction parameter calculation module 220, a compensation calculation module 230 and a correction module 240. In embodiments of the present invention, the self-capacitive touch panel 300 includes a plurality of upper electrodes and a plurality of lower electrodes. The lower electrodes and the upper electrodes are in a staggered arrangement along a first reference direction X. In the description below, the electrode shape/configuration in FIG. 1 is taken as an example to illustrate operations of the correction apparatus 200. The electrodes in FIG. 1 are replicated in FIG. 3, where electrodes shaded by slanting lines are upper electrodes, and non-shaded electrodes are lower electrodes.

As shown in FIG. 2, the self-capacitive touch panel 300 provides sensing results associated with the upper electrodes and sensing results associated with the lower electrodes to the initial coordinate calculation module 210. The initial coordinate calculation module 210 calculates a first initial coordinate x in the first reference direction X and a second initial coordinate y in a second reference direction Y of a touch position according to the sensing results. The correction apparatus 200 serves a main function of correcting the second coordinate y. In one embodiment, the initial coordinate calculation module 210 first groups all of the sensing results into multiple sensing result groups, and identifies the most probable sensing result group for the touch position. Taking the electrodes in FIG. 3 for example, assuming that the actual touch position is in the dotted circle 390, capacitance changes contributed by the upper electrodes 111 to 113 and the lower electrodes 121 to 123 are noticeably higher than those of other electrodes. In this situation, when calculating the first initial coordinate x and the second initial coordinate y, the initial coordinate calculation module 210 may consider only the sensing result groups formed by the capacitance changes of the upper electrodes 111 to 113 and the lower electrodes 121 to 123 and omits the sensing results associated with other electrodes.

Assuming that the initial coordinate calculation module 210 considers an N number of capacitance changes associated with the upper electrodes and a P number of capacitance changes associated with the lower electrodes (where N and P are natural numbers), the initial coordinate calculation module 210 may calculate the first initial coordinate x and the second initial coordinate y according to equations below:

$$x = \frac{\sum_{i=1}^{N}(C_i \times X_i) + \sum_{k=1}^{P}(C_k \times X_k)}{\sum_{i=1}^{N} C_i + \sum_{k=1}^{P} C_k} \quad \text{equation (1)}$$

$$y = \frac{\sum_{i=1}^{N}(C_i \times X_i)}{\sum_{i=1}^{N} C_i + \sum_{k=1}^{P} C_k} \times L \quad \text{equation (2)}$$

Figure 3:
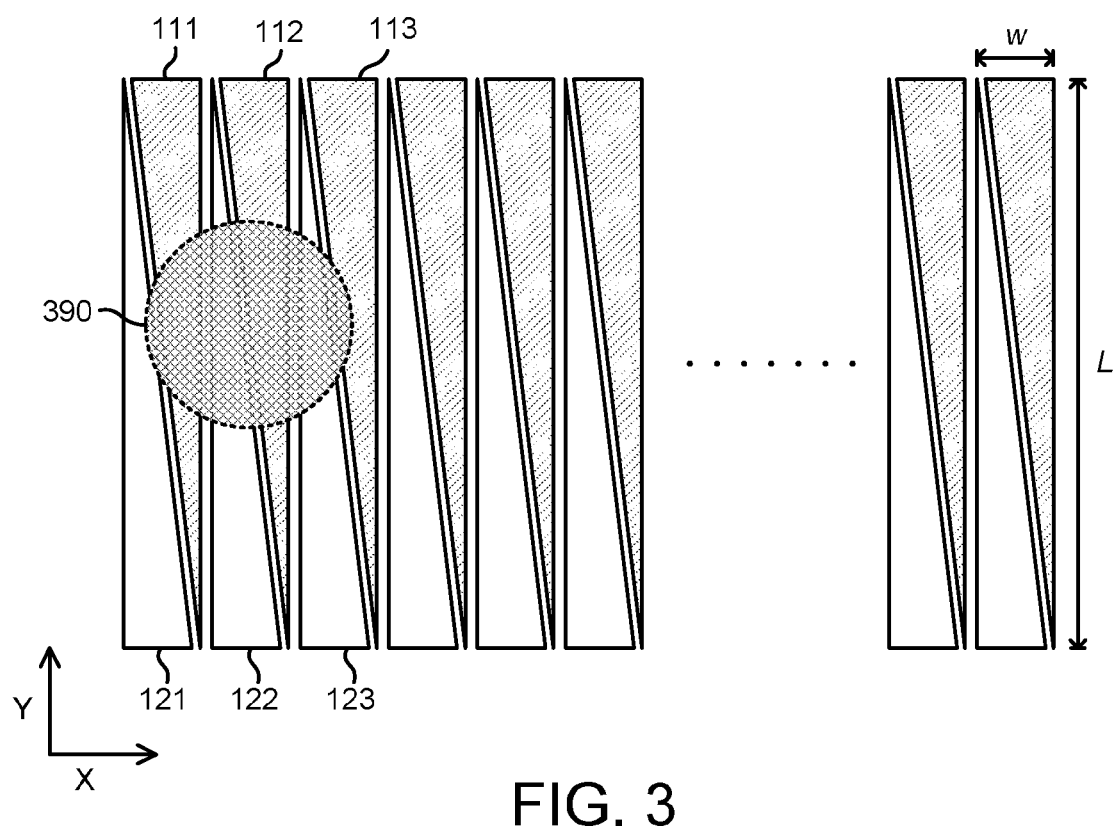
FIG. 3 is a corresponding relationship between upper electrodes and lower electrodes in a staggered arrangement.

In the above equations, i is an integral index ranging between 1 and N, k is an integral index ranging between 1 and P, $C_i$ represents the $i^{th}$ capacitance change in the N capacitance changes, $X_i$ represents a coordinate of the center of gravity corresponding to the $i^{th}$ capacitance change in the first reference direction X, $C_k$ represents the $k^{th}$ capacitance change in the P capacitance changes, $X_k$ represents a coordinate of the center of gravity corresponding to the $k^{th}$ capacitance change in the first reference direction X, and L represents a height of one single electrode in the Y direction (as shown in FIG. 3). Operation details for the initial coordinates represented by equations (1) and (2) are well-known to one person skilled in the art, and shall be omitted herein.

As shown in FIG. 2, the self-capacitive touch panel 300 also provides the sensing results associated with the upper electrodes and the sensing results associated with the lower electrodes to the correction parameter calculation module 220. The correction parameter calculation module 220 calculates a first correction parameter $x_1$ according to the sensing results associated with the lower electrodes, and calculates a second correction parameter $x_2$ according to the sensing results associated with the upper electrodes. In one embodiment, the correction parameter calculation module 220 calculates the first correction parameter $x_1$ and the second correction parameter $x_2$ according to equations below:

$$x_1 = \frac{\sum_{k=1}^{P}(C_k \times X_k)}{\sum_{k=1}^{P} C_k} \quad \text{equation (3)}$$

$$x_2 = \frac{\sum_{i=1}^{N}(C_i \times X_i)}{\sum_{i=1}^{N} C_i} \quad \text{equation (4)}$$

As seen from equations (3) and (4), the first correction parameter $x_1$ may be regarded as an X coordinate calculated by considering only the sensing results associated with the lower electrodes, and the second correction parameter $x_2$ may be regarded as another X coordinate calculated by considering only the sensing results associated with the upper electrodes.

The compensation calculation module 230 calculates a compensation amount comp according to the first correction parameter $x_1$, the second correction parameter $x_2$ and the first initial coordinate x. In one embodiment, the compensation calculation module 230 calculates the compensation amount comp according to an equation below:

$$\text{comp} = (x_2 - x_2 + w) \times x \times a + x^2 \times b \quad \text{equation (5)}$$

In equation (5), w is associated with a width of one upper electrode in the first reference direction X (as shown in FIG. 3), the width is an integral multiple of w, and a and b are predetermined values. As seen from equation (5), a relationship between the compensation amount comp and the first initial coordinate x may be represented by a quadratic equation, in which the linear coefficient is associated with a difference between the first correction parameter $x_1$ and the second correction parameter $x_2$. The predetermined values a and b may be determined in advance by a circuit designer through simulation experiments, and are designed to aim at minimizing an error in the corrected Y coordinate.

Next, the correction module 240 corrects the second initial coordinate y according to the compensation amount comp to generate a corrected coordinate y":

$$y'' = y + \text{comp} \quad \text{equation (6)}$$

As previously stated, for the electrode shape/configuration in FIG. 1, when a user touches a left or right border of the sensing region 100, the Y coordinate in the sensing result may contain a substantial error. In practice, a circuit designer may set the correction apparatus 200 to activate the correction mechanism only when the first initial coordinate x and the second initial coordinate y indicate that a touch event takes places at the left or right border of the sensing region 100 (with the range of the border region being defined by the circuit designer). In other words, when the user touch does not fall at the left or right border of the sensing region 100, the correction apparatus 200 need not perform the computation procedure associated with the foregoing correction, and directly adopts the first initial coordinate x and the second initial coordinate y.

Proven by simulation experiments, when the user touch occurs at the left and right borders of the sensing region 100, the corrected coordinate y" generated according to equations (1) to (6) is closer to the actual touch position than the non-corrected second initial coordinate y, hence providing a satisfactory correction effect.

In another embodiment, the upper electrodes and lower electrodes of the self-capacitive touch panel 300 may be divided into two categories of central electrodes and border electrodes. Taking the electrodes in FIG. 3 for example, a circuit designer may define four electrodes closest to the left border of the sensing region 100 (the upper electrodes 111 and 112 and the lower electrodes 121 and 122) and four electrodes closest to the right border of the sensing region 100 as border electrodes, and define the remaining electrodes as central electrodes (e.g., the upper electrode 113 and the lower electrode 123). It should be noted that, the scope of the present invention is not limited to the above example. A circuit designer may determine the number of border electrodes based on simulation experimental results.

Assume that when calculating the first initial coordinate x and the second coordinate y, the initial coordinate calculation module 210 considers an N number of central capacitance changes and an M number of border capacitance changes associated with the upper electrodes, as well as a P number of central capacitance changes and a Q number of border capacitance changes associated with the lower electrodes for the calculation. The initial coordinate calculation module 210 may calculate the first initial coordinate x according to an equation below:

$$x = \frac{\sum_{i=1}^{N}(C_i \times X_i) + \sum_{j=1}^{M}(C_j \times X_j \times \alpha 1) + \sum_{k=1}^{P}(C_k \times X_k) + \sum_{l=1}^{Q}(C_l \times X_l \times \alpha 2)}{\sum_{i=1}^{N} C_i + \sum_{j=1}^{M}(C_j \times \alpha 1) + \sum_{k=1}^{P} C_k + \sum_{l=1}^{Q}(C_l \times \alpha 2)} \quad \text{equation (7)}$$

In equation (7), i is an integral index ranging between 1 and N, j is an integral index ranging between 1 and M, k is an integral index ranging between 1 and P, l is an integral index ranging between 1 and Q, $C_i$ represents the $i^{th}$ central capacitance change in the N central capacitance changes, $X_i$ represents the coordinate of the center of gravity corresponding to the $i^{th}$ central capacitance change in the first reference direction X, $C_j$ represents the $j^{th}$ border capacitance change in the M border capacitance changes, $X_j$ represents the coordinate of the center of gravity corresponding to the $j^{th}$ border capacitance change in the first reference direction X, $C_k$ represents the $k^{th}$ central capacitance change in the P central capacitance changes, $X_k$ represents the coordinate of the center of gravity corresponding to the $k^{th}$ central capacitance change in the first reference direction X, $C_l$ represents the $l^{th}$ border capacitance change in the Q border capacitance changes, and $X_l$ represents the coordinate of the center of gravity corresponding to the $l^{th}$ border electrode in the first reference direction X.

Further, in equation (7), α1 and α2 are predetermined values. In one preferred embodiment, the predetermined values α1 and α2 are both equal to 2. That is, a weight of the capacitance changes contributed by the border electrodes is increased when the first initial coordinate x is calculated. It is seen from equation (1) and equation (7) that, when the values α1 and α2 are set to 1 at the same time, equation (7) is equal to equation (1).

Figure 4:
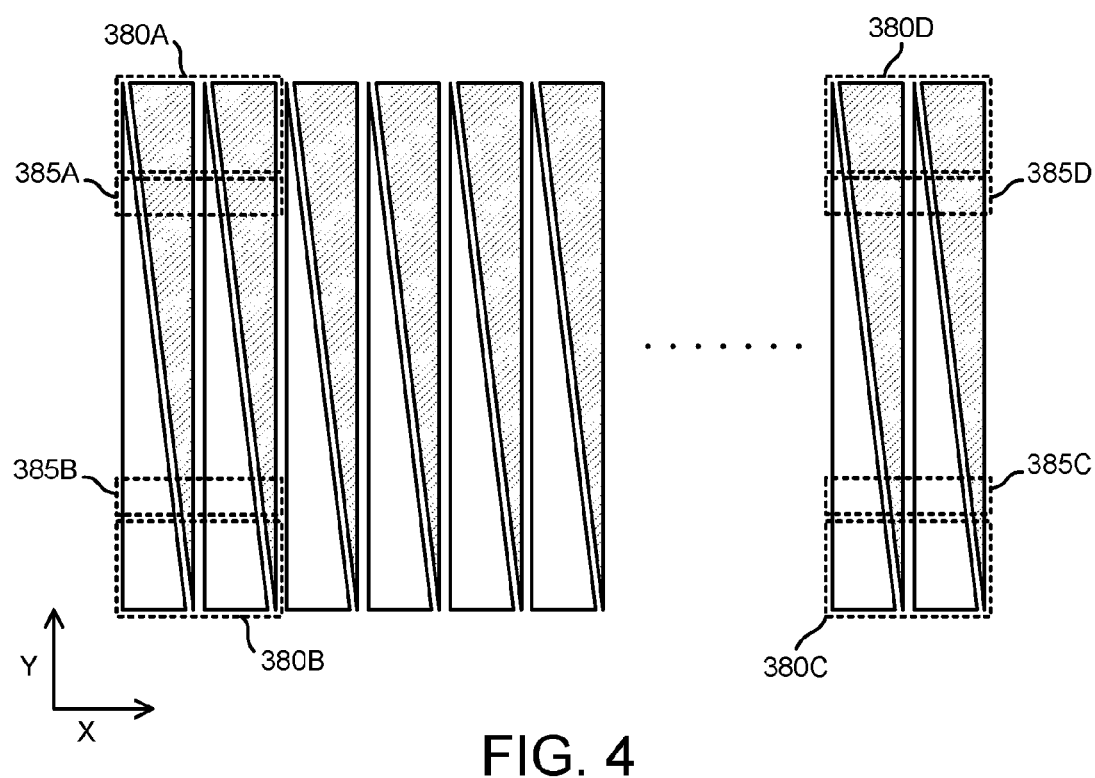
FIG. 4 is an example of ranges of corner regions, intersection regions and a central region.

According to the present invention, the compensation calculation module 230 may be designed to select different compensation computations according to a touch position estimated by the initial coordinate calculation module 210. In this situation, the first initial coordinate x and the second initial coordinate y are both provided to the compensation calculation module 230. For illustration purposes, the electrodes in FIG. 3 are replicated in FIG. 4. In one embodiment, when the first initial coordinate x and the second initial coordinate y indicated that the touch position falls in a corner region of any of the corner regions 380A to 380D, the compensation calculation module 230 calculates the compensation amount comp according to an equation below:

$$\text{comp} = (x_1 - x_2 + w) \times x \times a + x^2 \times c \quad \text{equation (8)}$$

In equation (8), c is a predetermined value, and c is greater than the value b in equation (5). In contrast, when the first initial coordinate x and the second initial coordinate y indicate that the touch position occurs in a central region outside the corner regions 380A to 380D, the compensation module 230 still adopts equation (5) to calculate the compensation amount comp. In other words, when the touch event takes places in a corner region, the compensation amount comp is increased.

In another embodiment, when the first initial coordinate x and the second initial coordinate y indicate that the touch position occurs in intersection regions 385A to 385D where the corner regions 380A to 380D intersect with the central region, the compensation calculation module 230 calculates the compensation amount comp according to an equation below:

$$\text{comp} = (x_1 - x_2 + w) \times x \times a + x^2 \times d \qquad \text{equation (9)}$$

In equation (9), c is a predetermined value, the value c in equation (8) is greater than d, and d is greater than the value b in equation (5). In the embodiment, when the first initial coordinate x and the second initial coordinate y indicate that the touch position occurs in the corner regions 380A to 380D, the compensation module 230 still adopts equation (8) to calculate the compensation amount comp. When the first initial coordinate x and the second initial coordinate y indicate that the touch position occurs in the central region outside the corner regions 380A to 380D and the intersection regions 385A to 385D, the compensation module 230 still adopts equation (5) to calculate the compensation amount comp. The reason for additionally considering the intersection regions is to prevent drastic changes in the compensation amounts between the corner regions and the central region.

Similar to the predetermined values a and b, a circuit designer may determine the predetermined values c and d in advance through simulation experiments, and the values c and d are also designed to aim at minimizing an error between the corrected Y coordinate and the Y coordinate of the actual touch position.

Figure 5:
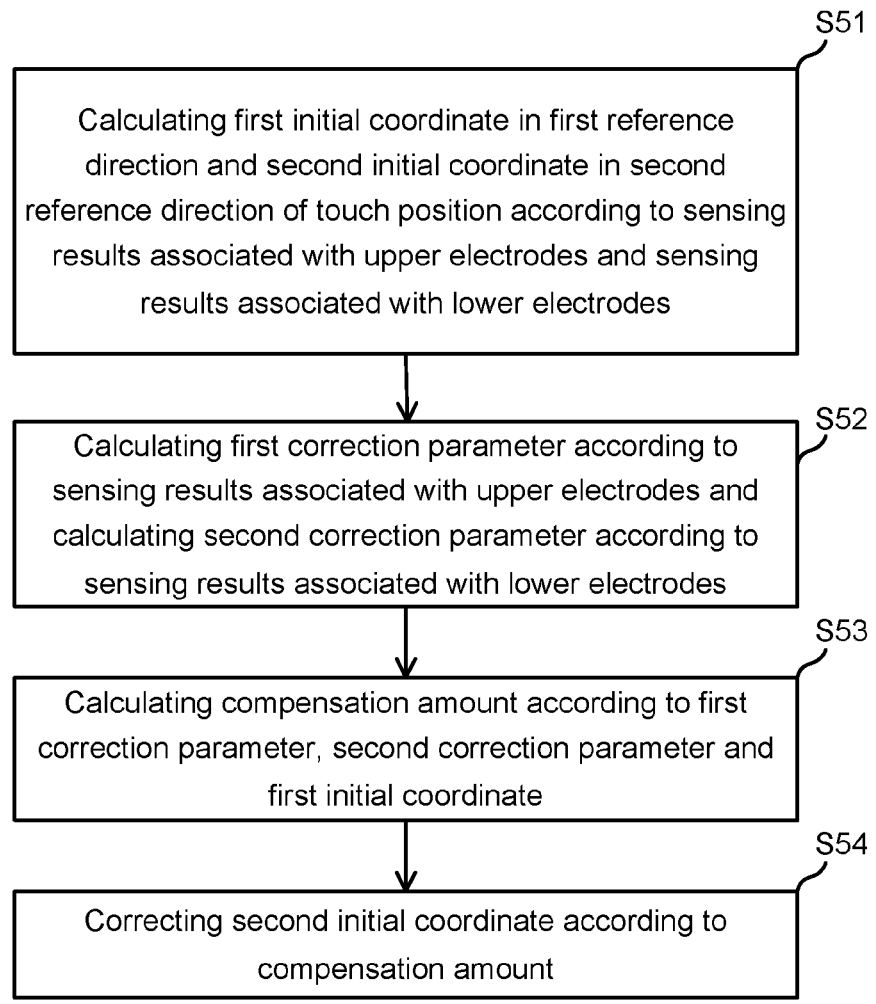
FIG. 5 is a flowchart of a process of a correction method according to an embodiment of the present invention.

A correction method for a self-capacitive touch panel is further provided according to another embodiment of the present invention. FIG. 5 shows a flowchart of the process of the correction method. The touch panel includes a plurality of upper electrodes and a plurality of lower electrodes. The lower electrodes and the upper electrodes are in a staggered arrangement along a first reference direction. In step S51, according to at least one sensing result associated with the upper electrodes and at least one sensing result associated with the lower electrodes, a first initial coordinate in the first reference direction and a second initial coordinate in a second reference direction of a touch position are calculated. The second reference direction is perpendicular to the first reference direction. In step S52, a first correction parameter is calculated according to the at least one sensing result associated with the lower electrodes, and a second correction parameter is calculated according to the at least one sensing result associated with the upper electrodes. In step S53, a compensation amount is calculated according to the first correction parameter, the second correction parameter and the first initial coordinate. In step S54, the second initial coordinate is corrected according to the compensation amount.

One person skilled in the art can understand that operation variations in the description associated with the correction apparatus 200 (e.g., different weights are applied to the capacitance changes of the central electrodes and the border electrodes when the first initial coordinate is calculated in step S51, or the equation adopted for calculating the compensation amount is adjusted according to the touch position in step S53) are applicable to the correction method in FIG. 5, and shall be omitted herein.

It should be noted that, the mathematical expressions are for illustrating principles and logics associated with the embodiments of the present invention. Unless otherwise specified, these mathematical expressions are not to be construed as limitations to the present invention. One person skilled in the art can understand that various technologies can realize the physical forms corresponding to these mathematical expressions. Further, the drawings of the present invention include function block diagrams of functional modules that are related to one another. These drawings are not detailed circuit diagrams, and connecting lines therein are for indicating signal flows. Direct electrical connections are not essential to achieve interactions between the functional elements and/or processes. Further, functions of individual elements need not be assigned as shown in the drawings, and discrete blocks may not be physically separate electronic elements.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A self-capacitive touch panel system, comprising:
   a self-capacitive touch panel comprising a plurality of upper electrodes and a plurality of lower electrodes, the plurality of lower electrodes and upper electrodes being in a staggered arrangement along a first reference direction; and
   a correction apparatus in communication with the self-capacitive touch panel, the correction apparatus including a controller configured to:
   calculate a first initial coordinate in the first reference direction and a second initial coordinate in a second reference direction of a touch position according to at least one sensing result associated with the upper electrodes and at least one sensing result associated with the lower electrodes, respectively, the second reference direction being substantially perpendicular to the first reference direction;
   calculate a first correction parameter in the first reference direction according to the at least one sensing result associated with the lower electrodes, and to calculate a second correction parameter in the first reference direction according to the at least one sensing result associated with the upper electrodes;
   calculate a compensation amount according to the first correction parameter, the second correction parameter and the first initial coordinate; and
   correct the second initial coordinate according to the compensation amount,
   wherein the at least one sensing result associated with the upper electrodes comprises an N number of central capacitance changes and an M number of border capacitance changes, the at least one sensing result associated with the lower electrodes comprises a P number of central capacitance changes and a Q number of border capacitance changes, N, M, P and Q are natural numbers, and the controller calculates the first initial coordinate (x) according to an equation:

$$x = \frac{\sum_{i=1}^{N} (C_i \times X_i) + \sum_{j=1}^{M} (C_j \times X_j \times \alpha 1) + \sum_{k=1}^{P} (C_k \times X_k) + \sum_{l=1}^{Q} (C_l \times X_l \times \alpha 2)}{\sum_{i=1}^{N} C_i + \sum_{j=1}^{M} (C_j \times \alpha 1) + \sum_{k=1}^{P} C_k + \sum_{l=1}^{Q} (C_l \times \alpha 2)},$$

where i is an integral index ranging between 1 and N, j is an integral index ranging between 1 and M, k is an integral index ranging between 1 and P, l is an integral index ranging between 1 and Q, $C_i$ represents $i^{th}$ central capacitance change in the N number of central capacitance changes, $X_i$ represents a coordinate of a center of gravity corresponding to $i^{th}$ central capacitance change in the first reference direction X, $C_j$ represents $j^{th}$ border capacitance change in the M number of border capacitance changes, $X_j$ represents a coordinate of a center of gravity corresponding to $j^{th}$ border capacitance change in the first reference direction X, $C_k$ represents $k^{th}$ central capacitance change in the P number of central capacitance changes, $X_k$ represents a coordinate of a center of gravity corresponding to $k^{th}$ central capacitance change in the first reference direction X, $C_l$ represents $l^{th}$ border capacitance change in the Q number of border capacitance changes, $X_l$ represents a coordinate of a center of gravity corresponding to $l^{th}$ border electrode in the first reference direction X, and α1 and α2 are predetermined values; and the controller calculates the first correction parameter ($x_1$) and the second correction parameter ($x_2$) according to equations:

$$x_1 = \frac{\sum_{k=1}^{P}(C_k \times X_k) + \sum_{l=1}^{Q}(C_l \times X_l)}{\sum_{k=1}^{P}C_k + \sum_{l=1}^{Q}C_l}; \text{ and}$$

$$x_2 = \frac{\sum_{i=1}^{N}(C_i \times X_i) + \sum_{j=1}^{M}(C_j \times X_j)}{\sum_{i=1}^{N}C_i + \sum_{j=1}^{M}C_j}.$$

2. The self-capacitive touch panel system according to claim 1, wherein a planar contour of each of the upper electrodes and each of the lower electrodes is similar to a right triangle, and the upper electrodes respectively correspond to the lower electrodes.

3. The self-capacitive touch panel system according to claim 1, wherein the predetermined values α1 and α2 are simultaneously equal to 1 or simultaneously equal to 2.

4. The self-capacitive touch panel system according to claim 1, wherein the controller is configured to calculate the compensation amount (comp) according to an equation:

$$\text{comp}=(x_1-x_2+w)\times x\times a+x^2\times b;$$

where w is associated with a width of one of the upper electrodes in the first reference direction, the width is an integral multiple of w, and a and b are predetermined values.

5. The self-capacitive touch panel system according to claim 1, wherein when the first initial coordinate and the second initial coordinate indicate that the touch position falls in a central region, the controller is configured to calculate the compensation amount (comp) according to an equation:

$$\text{comp}=(x_1-x_2+w)\times x\times a+x^2\times b;$$

when the first initial coordinate and the second initial coordinate indicate that the touch position falls in a corner region, the controller is configured to calculate the compensation amount (comp) according to an equation:

$$\text{comp}=(x_1-x_2+w)\times x\times a+x^2\times c;$$

where w is substantially equal to a width of one of the upper electrodes in the first reference direction, a, b and c are predetermined values, and c is greater than b.

6. The self-capacitive touch panel system according to claim 1, wherein when the first initial coordinate and the second initial coordinate indicate that the touch position falls in a central region, the controller is configured to calculate the compensation amount (comp) according to an equation:

$$\text{comp}=(x_1-x_2+w)\times x\times a+x^2\times b;$$

when the first initial coordinate and the second initial coordinate indicate that the touch position falls in a corner region, the controller is configured to calculate the compensation amount (comp) according to an equation:

$$\text{comp}=(x_1-x_2+w)\times x\times a+x^2\times c;$$

when the first initial coordinate and the second initial coordinate indicate that the touch position falls in an intersection region of the central region and the corner region, the controller is configured to calculate the compensation amount (comp) according to an equation:

$$\text{comp}=(x_1-x_2+w)\times x\times a+x^2\times d;$$

where w is substantially equal to a width of one of the upper electrodes in the first reference direction, a, b, c and d are predetermined values, c is greater than d, and d is greater than b.

7. A correction method for a self-capacitive touch panel having a correction apparatus including a controller, the touch panel comprising a plurality of upper electrodes and a plurality of lower electrodes, the plurality of lower electrodes and upper electrodes being in a staggered arrangement along a first reference direction, the correction method comprising the controller performing operations of:
a) calculating a first initial coordinate in the first reference direction and a second initial coordinate in a second reference direction of a touch position according to at least one sensing result associated with the upper electrodes and at least one sensing result associated with the lower electrodes, respectively, the second reference direction being substantially perpendicular to the first reference direction;
b) calculating a first correction parameter in the first reference direction according to the at least one sensing result associated with the lower electrodes;
c) calculating a second correction parameter in the first reference direction according to the at least one sensing result associated with the upper electrodes;
d) calculating a compensation amount according to the first correction parameter, the second correction parameter and the first initial coordinate; and
e) correcting the second initial coordinate according to the compensation amount,
wherein the at least one sensing result associated with the upper electrodes comprises an N number of central capacitance changes and an M number of border capacitance changes, the at least one sensing result associated with the lower electrodes comprises a P number of central capacitance changes and a Q number of border capacitance changes, N, M, P and Q are natural numbers, and operation (a) comprising calculating the first initial coordinate (x) according to an equation:

$$x = \frac{\sum_{i=1}^{N}(C_i \times X_i) + \sum_{j=1}^{M}(C_j \times X_j \times \alpha 1) + \sum_{k=1}^{P}(C_k \times X_k) + \sum_{l=1}^{Q}(C_l \times X_l \times \alpha 2)}{\sum_{i=1}^{N} C_i + \sum_{j=1}^{M}(C_j \times \alpha 1) + \sum_{k=1}^{P} C_k + \sum_{l=1}^{Q}(C_l \times \alpha 2)},$$

where i is an integral index ranging between 1 and N, j is an integral index ranging between 1 and M, k is an integral index ranging between 1 and P, l is an integral index ranging between 1 and Q, $C_i$ represents $i^{th}$ central capacitance change in the N number of central capacitance changes, $X_i$ represents a coordinate of a center of gravity corresponding to $i^{th}$ central capacitance change in the first reference direction X, $C_j$ represents $j^{th}$ border capacitance change in the M number of border capacitance changes, $X_j$ represents a coordinate of a center of gravity corresponding to $j^{th}$ border capacitance change in the first reference direction X, $C_k$ represents $k^{th}$ central capacitance change in the P number of central capacitance changes, $X_k$ represents a coordinate of a center of gravity corresponding to $k^{th}$ central capacitance change in the first reference direction X, $C_l$ represents $l^{th}$ border capacitance change in the Q number of border capacitance changes, $X_l$ represents a coordinate of a center of gravity corresponding to $l^{th}$ border electrode in the first reference direction X, and $\alpha 1$ and $\alpha 2$ are predetermined values; and operation (b) to operation (c) comprise calculating the first correction parameter ($x_1$) and the second correction parameter ($x_2$) according to equations:

$$x_1 = \frac{\sum_{k=1}^{P}(C_k \times X_k) + \sum_{l=1}^{Q}(C_l \times X_l)}{\sum_{k=1}^{P} C_k + \sum_{l=1}^{Q} C_l}; \text{ and}$$

$$x_2 = \frac{\sum_{i=1}^{N}(C_i \times X_i) + \sum_{j=1}^{M}(C_j \times X_j)}{\sum_{i=1}^{N} C_i + \sum_{j=1}^{M} C_j}.$$

8. The correction method according to claim 7, wherein a planar contour of each of the upper electrodes and each of the lower electrodes is similar to a right triangle, and the upper electrodes respectively correspond to the lower electrodes.

9. The correction method according to claim 7, wherein the predetermined values $\alpha 1$ and $\alpha 2$ are simultaneously equal to 1 or simultaneously equal to 2.

10. The correction method according to claim 7, wherein operation (d) comprises calculating the compensation amount (comp) according to an equation:

$$\text{comp}=(x_1-x_2+w)\times x\times a + x^2 \times b;$$

where w is associated with a width of one of the upper electrodes in the first reference direction, the width is an integral multiple of w, and a and b are predetermined values.

11. The correction method according to claim 7, wherein operation (d) comprises:
   d1) when the first initial coordinate and the second initial coordinate indicate that the touch position falls in a central region, calculating the compensation amount (comp) according to an equation:

$$\text{comp}=(x_1-x_2+w)\times x\times a + x^2 \times b; \text{ and}$$

d2) when the first initial coordinate and the second initial coordinate indicate that the touch position falls in a corner region, calculating the compensation amount (comp) according to an equation:

$$\text{comp}=(x_1-x_2+w)\times x\times a + x^2 \times c;$$

where w is substantially equal to a width of one of the upper electrodes in the first reference direction, a, b and c are predetermined values, and c is greater than b.

12. The correction method according to claim 7, wherein operation (d) comprises:
   d1) when the first initial coordinate and the second initial coordinate indicate that the touch position falls in a central region, calculating the compensation amount (comp) according to an equation:

$$\text{comp}=(x_1-x_2+w)\times x\times a + x^2 \times b;$$

d2) when the first initial coordinate and the second initial coordinate indicate that the touch position falls in a corner region, calculating the compensation amount (comp) according to an equation:

$$\text{comp}=(x_1-x_2+w)\times x\times a + x^2 \times c; \text{ and}$$

d3) when the first initial coordinate and the second initial coordinate indicate that the touch position falls in an intersection region of the central region and the corner region, calculating the compensation amount (comp) according to an equation:

$$\text{comp}=(x_1-x_2+w)\times x\times a + x^2 \times d;$$

where w is substantially equal to a width of one of the upper electrodes in the first reference direction, a, b, c and d are predetermined values, c is greater than d, and d is greater than b.

* * * * *